(12) United States Patent
Barkowski et al.

(10) Patent No.: US 8,406,990 B2
(45) Date of Patent: Mar. 26, 2013

(54) NAVIGATIONAL DEVICE

(75) Inventors: Andre Barkowski, Salzgitter (DE);
Thomas Jung, Bielefeld (DE); Ulrich Kersken, Diekholzen (DE); Christian Jaeger, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 2064 days.

(21) Appl. No.: 10/528,180

(22) PCT Filed: Jul. 21, 2003

(86) PCT No.: PCT/DE03/02425
§ 371 (c)(1),
(2), (4) Date: Oct. 6, 2005

(87) PCT Pub. No.: WO2004/031692
PCT Pub. Date: Apr. 15, 2004

(65) Prior Publication Data
US 2006/0100774 A1    May 11, 2006

(30) Foreign Application Priority Data
Sep. 27, 2002  (DE) .................... 102 45 334

(51) Int. Cl.
*G01C 21/00* (2006.01)
*G06F 17/00* (2006.01)

(52) U.S. Cl. ........ 701/400; 700/401; 700/402; 700/409; 700/411

(58) Field of Classification Search .............. 701/117, 701/118, 119, 200, 201, 202, 207, 208, 209, 701/211; 340/990, 995.1, 995.19, 995.2
See application file for complete search history.

(56) References Cited

U.S. PATENT DOCUMENTS

| | | | |
|---|---|---|---|
| 6,223,125 B1* | 4/2001 | Hall | 701/301 |
| 2002/0049534 A1* | 4/2002 | Yuda et al. | 701/209 |
| 2002/0055808 A1 | 5/2002 | Matsumoto | |
| 2002/0198632 A1* | 12/2002 | Breed et al. | 701/1 |

FOREIGN PATENT DOCUMENTS

| | | |
|---|---|---|
| EP | 1 195 578 | 4/2002 |
| JP | 59127200 | 7/1984 |
| JP | 2000-275057 | 10/2000 |
| JP | 2001 141 495 | 5/2001 |
| JP | 2002 107161 | 4/2002 |

\* cited by examiner

*Primary Examiner* — Ian Jen
(74) *Attorney, Agent, or Firm* — Kenyon & Kenyon LLP

(57) ABSTRACT

A navigational device for guiding a vehicle within a network of traffic routes provides, for guidance purposes, a guide object that is shown in relation to the traffic route in such a manner that the guide object's movement represents driving maneuvers to be performed by the driver. The driver emulates the driving maneuvers shown to him/her and thus follows the previously calculated route.

12 Claims, 4 Drawing Sheets

NAVIGATIONAL DEVICE

FIELD OF THE INVENTION

The present invention is related to a navigational device for guiding a vehicle.

BACKGROUND INFORMATION

Navigational devices for guiding a vehicle within a network of traffic routes provide that driving instructions are optically displayed by a display of arrow representations in a display in front of the driver. Such an optical display may be augmented by an acoustic output in that a description of the driving instruction, for example "turn right now" is output along with the display. The driver, acting on his/her own, associates the driving instructions with the prevailing traffic situation up ahead. The driver is shown a three-dimensional view of the roads up ahead to provide him/her with a most realistic as possible representation of these roads.

SUMMARY

The navigational device according to the present invention provides that a guide object is shown to the driver, and he/she merely needs to follow the guide object. For this purpose, the guide object is shown virtually on a suitable display, e.g., traveling a short way in front of the driver, along the travel route to be traveled by the driver. The guide object demonstrates to the driver the driving maneuvers that he/she should execute, so that the driver merely needs to follow along and emulate the appropriate driving maneuvers.

Thus, the need for converting symbolic, optical displays or acoustic instructions into an active driving maneuver, is eliminated. By emulating the action demonstrated by the guide object, it is possible to eliminate linguistic misunderstandings, such as mixing up the left and right sides, when responding to a driving instruction. Also, vehicle guidance is made easier for inexperienced drivers.

As a guide object, an image of a vehicle may be used, since this may be easily recognized by a driver and reminds the driver of a situation where the driver, in accordance with a previous arrangement, follows a real vehicle driving ahead, to a previously agreed upon destination.

In addition, the guide object may be placed at a given distance in front of a current position of the vehicle on the travel route and to indicate the same, since, in this manner, the driver is given enough time to reproduce the driving maneuver executed by the guide object. This distance is may be selected as a function of the current vehicle velocity, the distance being increased with increasing vehicle velocity to provide the driver with enough time to react to the driving maneuver that is displayed.

In addition, the guide object may be overlaid directly into the driver's field of view on the traffic route arranged in front of him/her. In this manner, there is no need for the driver to turn his/her eyes away from the travel path, and he/she is nevertheless guided by the guide object in accordance with the travel route planned by the driver.

In the case of a representation in a display outside of the field of view, it may be advantageous to also show the area surrounding the traffic route, for example buildings surrounding the traffic route, to make it easier for the driver to orient himself/herself and to correlate the guide object to the actual road conditions.

An arrangement for sensing a traffic situation is provided, for example a sensor system to sense the distance to other vehicles arranged in the vicinity of the vehicle, e.g., to the side of the vehicle and in front of the vehicle. In this manner, a display of the guide object may be controlled if there is an obstacle arranged in front of the vehicle or a vehicle traveling in front of the vehicle in such a manner that the guide object is suitably delayed and made to virtually approach the obstacle at an adapted velocity. The driver, using his/her control, e.g., the brake, may then react already to this warning display of the guide object and adapt his/her velocity accordingly. In addition, an arrangement for determining the actual highest permissible speed may be provided to ensure that the guide object does not move more rapidly along the travel route than may be allowed by the highest permissible speed at this location, the current position being determined for this purpose, for example, by a position-finding system. In this manner, the driver, who is following the guide object, is deterred from exceeding a highest permissible, currently effective speed in each instance.

To aid the driver, other display fields are may be provided to warn him/her of other dangers or to display traffic signs sensed by an optical unit. Display areas are provided on the guide object in order to display warning information, for example in written form, or a directional indication on the guide object. In this connection, for example, a directional signal may be shown or, as warning information, a display of a brake light activation.

To augment the optical display, an acoustic output may be provided in order to warn the driver in a more comprehensive manner.

DETAILED DESCRIPTION

The navigational device according to the present invention may be used for guiding any vehicles at all within a network of traffic routes. Its use for guiding a motor vehicle in a road network may be advantageous, since this entails driving maneuvers which, to some degree, are complicated and are performed out over short distances, especially in an inner-city area. The navigational device according to the present invention is elucidated in the following on the basis of an example of a navigational device that is installed in a motor vehicle.

Figure 1:
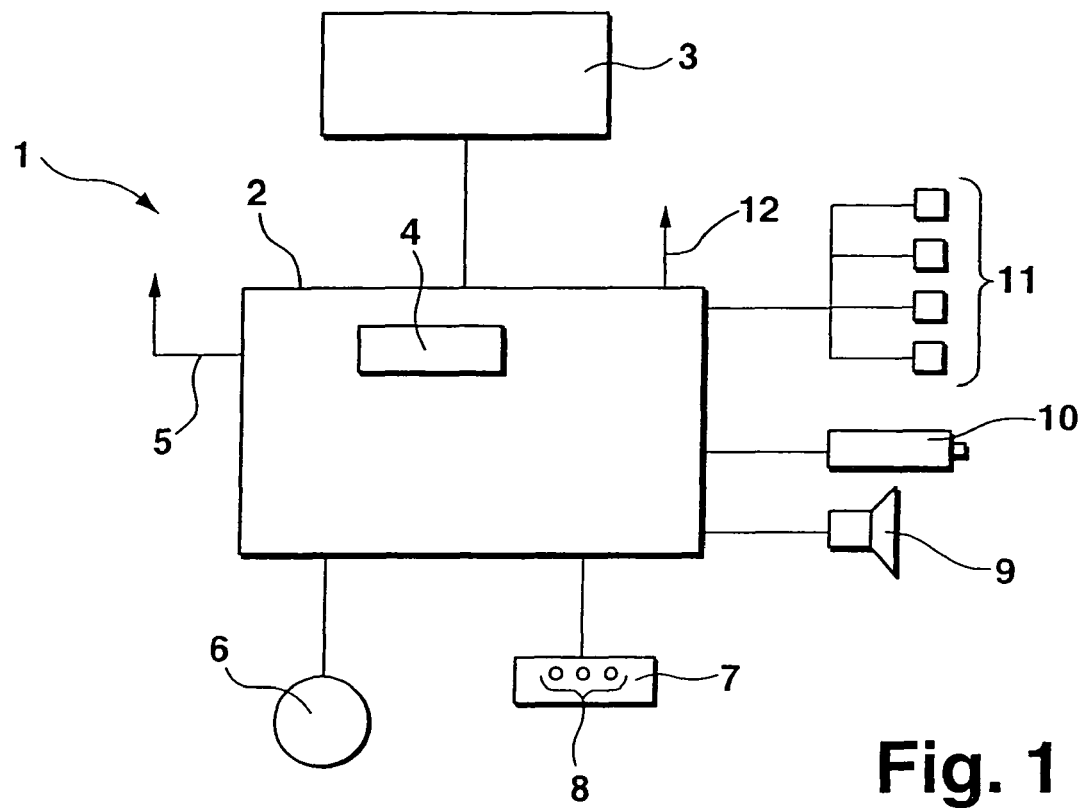
FIG. 1 shows a schematic configuration of a navigational device according to the present invention.

FIG. 1 illustrates a navigational device 1 including a central processing unit 2 to which a display 3 is connected. Central processing unit 2 includes a processing unit 4. Also connected to central processing unit 2 is a position-finding device 5 for determining the momentary vehicle position. Position-finding device 5 is may be configured as a satellite-based position-finding unit for determining positions via a satellite-based position-finding system, e.g., the GPS (global positioning system). In addition, rate-of-rotation and distance sensors may be connected to central processing unit 2 to determine positions. Moreover, any other vehicle position-finding systems for determining positions may also be used. Processing unit 4 may access a data storage-medium drive 6 including a data storage medium including a road network stored thereon. The navigational device is controllable via a control unit 7 by actuating selection keys 8. Also linked to central processing unit 2 are a loudspeaker 9 for acoustic output, a camera device 10 for observing the driving area arranged in front of the vehicle, and distance sensors 11 for determining the distance to vehicles traveling ahead of or next to the vehicle. Distance sensors 11 may be configured as radar sensors, as ultrasonic sensors and/or as video sensors. A current position of the vehicle is determined using position-finding device 5. Via selection keys 8 of control unit 7, at this point, a user enters a destination into navigational device 1, processing unit 4 determining a travel route from the current vehicle position to the indicated destination by accessing the data storage medium, in the form of a CD Rom, for example, inserted in data storage-medium drive 6. Appropriate driving instructions are output via display 3, as well as over loudspeaker 9, to the driver, to implement the driving action, as soon as a designated position for outputting the driving instruction has been reached via position-finding device 5. In one exemplary embodiment, central processing unit 2, as well as data storage-medium drive 6 and control unit 7 are configured in a center console of the vehicle.

Figure 2:
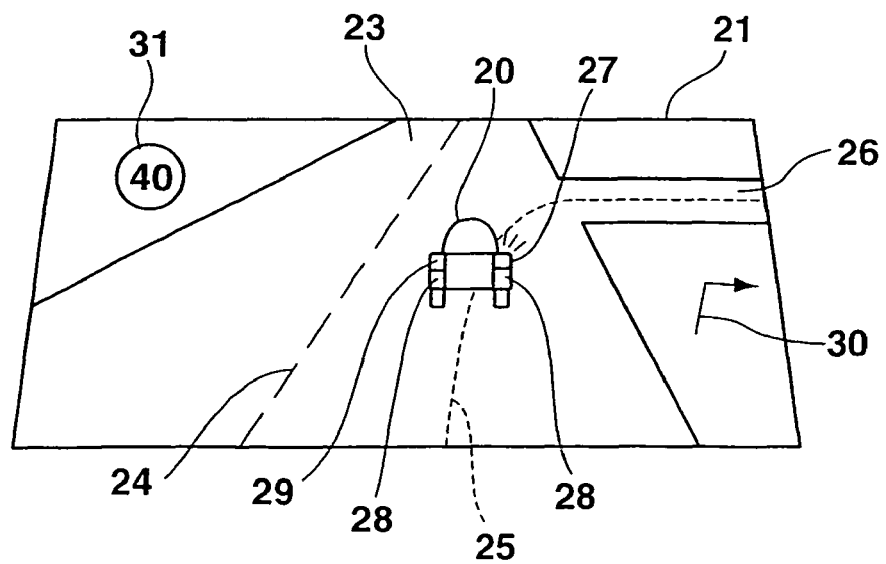
FIG. 2 shows a first example embodiment of a display of a navigational device according to the present invention.

FIG. 2 shows a first exemplary embodiment of a display of a guide object in accordance with the present invention. In this exemplary embodiment, display 3 is configured as a so-called head-up display, where, as a guide object, a vehicle image 20 is projected, e.g., as a virtual image, onto a windshield 21 in front of the driver. In this context, the driver perceives vehicle image 20 as being superimposed on actual travel path (road) 23, i.e., the road ahead of him/her. In the process, vehicle image 20 is made visible on windshield 21 in such a manner that its appearance is analogous to an actual vehicle traveling in front of the driver. Thus, vehicle image 20 may be made visible in travel path 23 at a distance that corresponds to the so-called half speedometer distance, thus it is approximately distant by half of the amount of the current vehicle speed in kilometers per hour. Vehicle image 20, which, accordingly, is made visible in the travel path, to the right of a lane marking 24, is displayed along a travel route 25 drawn in with dotted lines that had previously been calculated by processing unit 4. In a first exemplary embodiment, the travel route itself is not shown. However, in another exemplary embodiment, it is also possible to overlay a course of the travel route onto the travel path. In this context, the representation in a virtual display enables vehicle image 20 to be shown in such a manner that a spatial impression is created for an observer, so that the virtual image actually appears to be distant from the vehicle by a distance that corresponds to its size. This entails adapting the size of the vehicle image to the calculated distance. Thus, the smaller the distance of the vehicle to the virtual position of vehicle image 20, the larger vehicle image 20 appears to the driver. In the present exemplary embodiment, a right turn is planned in travel route 25 at the next exit from road 23, i.e., the previous travel path, into a side road 26. To this end, a right turn-signal display field 27 is activated in vehicle image 20, directing the driver to actuate the directional signal of his/her vehicle, to the extent possible, in time before reaching the intersection. After turning off, right turn-signal display field 27 extinguishes again. Vehicle image 20 may also include brake-light fields 28, as well as a left turn-signal display field 29. The purpose of the left turn-signal field is to indicate a left-turn operation; brake-light fields 28 indicate a deceleration to be undertaken. Thus, they may be activated, for example, shortly before the turn-off into side road 26 and thereby inform the driver of the need to decelerate his/her vehicle. In addition thereto, other guide symbols, such as a turn-off arrow 30 or a speed indication 31 may be made visible in windshield 21 as well, to provide the driver with additional information for his/her trip. In this context, the additional information 30, 31 may be placed at the edge of the windshield, so as not to hinder the driver's field of view to the extent that is possible. For this reason, the vehicle image display may be configured in such a manner that merely regions of the windshield are colored, so that processes taking place beyond the vehicle image are still easily visible. This may also be accomplished, for example, by reducing the display to an outline representation including the corresponding warning fields, so that the driver's field of view is not interfered with.

Instead of a vehicle image, other objects may be made visible as well. These may be, for example, simple graphic objects, for example a circle or, in some instances, also an object formed by dots, which retains its size, independently of a virtual distance. In this manner, the outlay for a calculation is reduced, as compared to a representation of a vehicle image, for example. In some instances, these objects may also include display areas for a directional display and/or a warning display.

Vehicles in the area surrounding the vehicle are able to be ascertained using camera device 10 and/or distance sensors 11. Under conditions of very heavy traffic directly in front of the vehicle, overlaying an additional vehicle could distract the driver from these vehicles. For that reason, another exemplary embodiment of the present invention provides for suppressing the insertion of a guide object when the distance to a vehicle driving in front of the vehicle falls below a certain magnitude, such as 50 meters. In such a case, driving instructions are output acoustically via loudspeaker 9.

In another exemplary embodiment, distance sensors 11 and/or camera device 10 are used to determine the distance to other vehicles driving ahead of the vehicle, the velocity of the guide object being adapted to the velocity of these other vehicles traveling in front of the vehicle. Thus, a driver is able to control the velocity of his/her vehicle in accordance with the traffic up ahead.

In addition, traffic signs may be recognized, for example, via camera device 10 and, in accordance with symbolically shown speed indication 31, being displayed as well in windshield 21. In this context, the current highest velocity is included in the consideration when calculating the velocity of the virtual motion of the guide object. In addition, via an air interface 12, current highest velocities may either be transmitted from a service control point or from transmitting installations located along the side of the road, to central processing unit 2, in the same manner as the highest velocities recorded by camera device 10, these being included in the consideration when displaying the guide object.

Figure 3:
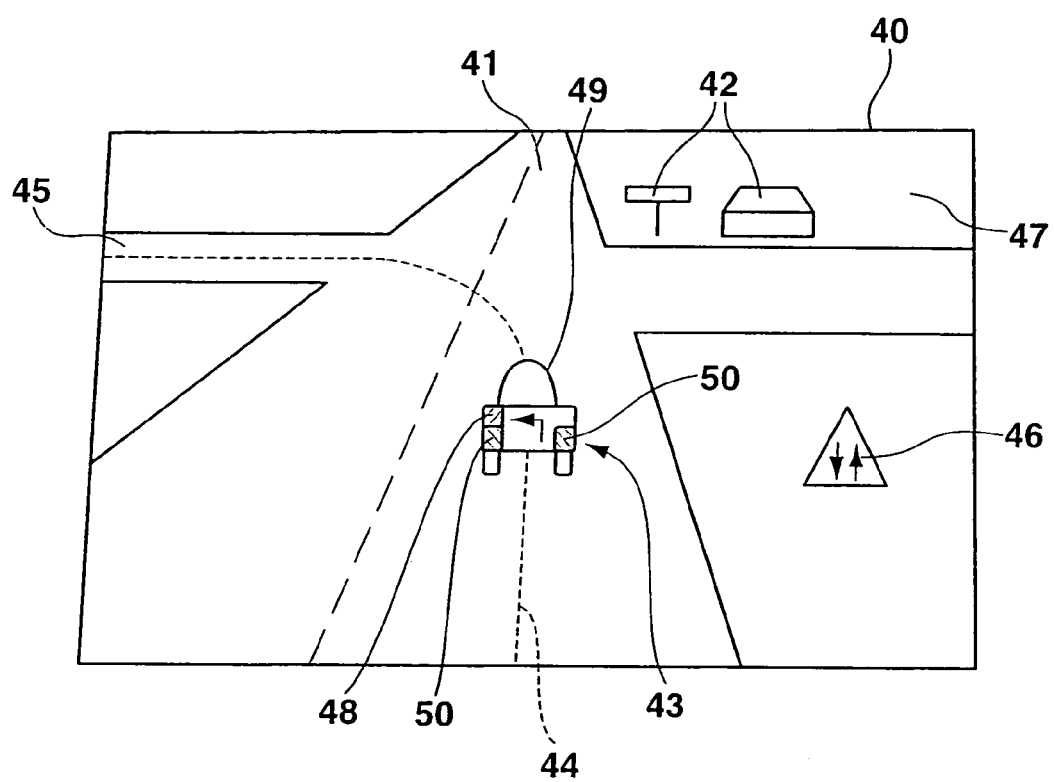
FIG. 3 shows a second exemplary embodiment of a display of a navigational device according to the present invention.

Another exemplary embodiment of display 3 is illustrated in FIG. 3. In a display area 40, which is arranged in front of the driver, either in an indicating instrument behind the steering wheel or in the center console, a course of a road 41 is shown directly in front of the vehicle. In this connection, in one exemplary embodiment, objects located next to the road, for example building 42, in this case a gas station, are either included symbolically or photorealistically in the display. Explanatory comments regarding buildings 42 or other additionally overlaid objects are made possible by informative text 47. In one exemplary embodiment, objects recorded by camera device 10 may be incorporated in the display in display area 40. In this context, another exemplary embodiment provides for a perspective display, the area surrounding the vehicle may be shown as a simplified representation, in order to, in fact, give the driver the necessary orientation, however, without distracting him/her with a confusing display. In a manner comparable to the superimposing of vehicle image 20 as in FIG. 2, a vehicle image 43 is placed in front of the vehicle on a route 44 and displayed in display area 40 on road 41. In the present case, route 44 turns into a side road 45 that branches off to the left from road 41 presently traveled on. If necessary, a warning symbol 46 alerts a driver of the need to heed oncoming traffic. In the illustrated exemplary embodiment shown here, on the one hand, a turn-signal area 48 for indicating a left turn, a directional arrow 49 made visible in vehicle image 43, as well as brake-light fields 50 are activated on vehicle image 43, indicating the need to decelerate before turning into side road 45. Another exemplary embodiment also provides for displaying the vehicle surroundings as a bird's eye view, in a direct plan view similar to a map display, and to enter the vehicle, as well as the guide object positioned in front of the vehicle, into the plan view, into the street scenery. The driver is then able to orient himself/herself similarly to when using a map, the guide object demonstrating to him/her the driving maneuvers to be performed out by the driver. Such a plan-view display may correspond, for example, to a representation of the vehicle and guide object in accordance with FIGS. 4 and 5 which are utilized in the following to provide a general explanation of the operating principle of the navigational device according to the present invention.

Figure 4:
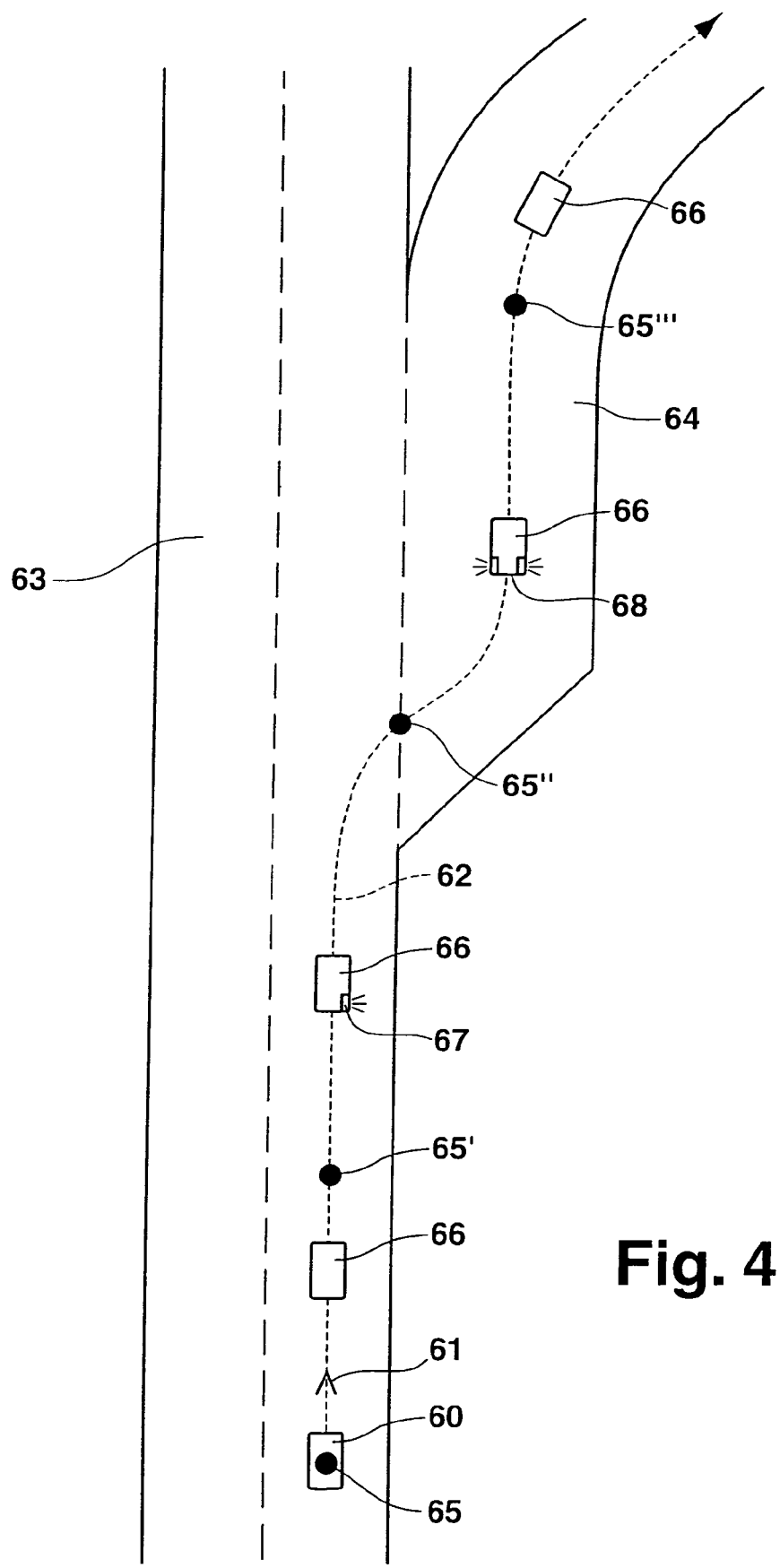
FIG. 4 shows a functional sequence of a turning operation, utilizing a guidance by the navigational device according to the present invention.

A turning operation performed by the navigational device according to the present invention is shown in FIG. 4. It is intended for a vehicle 60, which moves along arrow direction 61, along a route 62, previously calculated by the navigational device and drawn in with dotted lines, on a road 63, to turn off into an exit 64. In this connection, momentary vehicle position 65 is illustrated as a dot, which is drawn in further on, along route 62 at various, subsequent points in time. At a first point in time, in which the dot is denoted by 65, a guide object 66 in accordance with FIG. 2 or 3 is shown to a driver. In this context, the guide object is shown in display 3 in such a manner that the driver perceives it to be at an average distance of, for example, 50 meters in front of the driver. At a second point in time, in which the current vehicle position is denoted by 65', a directional signal 67 of guide object 66 is activated, which is also shown here at approximately 50 meters in front of vehicle position 65'. At a third point in time, at a current vehicle position 65'', the vehicle is already turned into the deceleration lane of exit 64. Brake lights 68 are now activated on guide object 66, indicating to the driver the need to decelerate his/her vehicle. Meanwhile, at a third vehicle position 65''', the distance between current vehicle position 65''' and guide object 65 displayed up ahead has decreased, since the speed of the vehicle has also decreased. The vehicle is now guided by the guide object, in the direction of the arrow, along exit 64.

Figure 5:
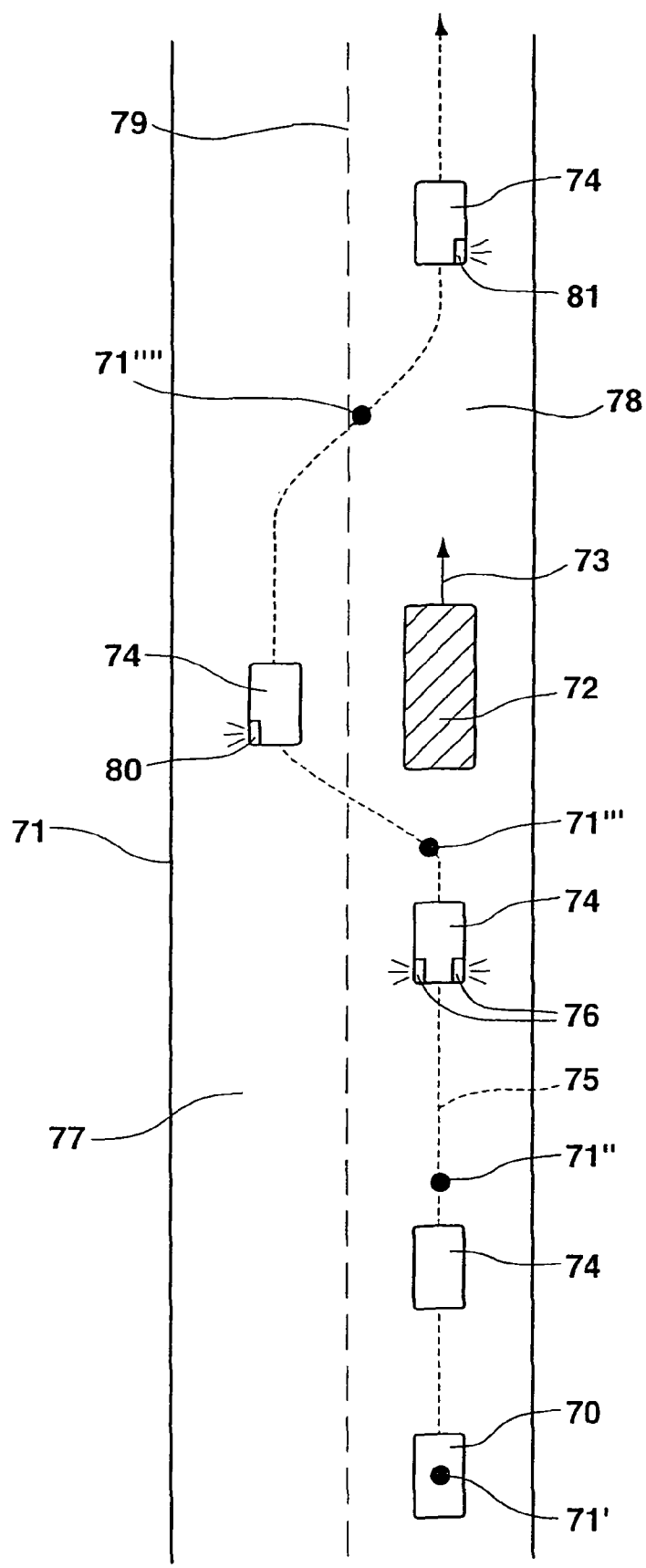
FIG. 5 shows an example of a passing operation, utilizing a guidance by the navigational device according to the present invention.

A second exemplary embodiment of a vehicle guidance using the navigational device according to the present invention is illustrated in FIG. 5. In this instance, a vehicle 70 traveling along a road 71, encounters a vehicle driving very slowly ahead of it, for example a farm vehicle, moving at a slow vehicle velocity in arrow direction 73 along road 71. A precalculated route runs along road 71. An actual travel path along a planned route 75 is drawn in the representation as a dotted line on road 71. At a first point in time, vehicle position 71' is arranged on road 71 and is guided by a guide object 74 driving ahead of it along a route 75 drawn in as a dotted line. At a later point in time, at a second vehicle position 71'', the distance sensors of the vehicle, e.g., a long-range radar sensor, detect that, from the perspective of current position 71'', slow-moving vehicle 72 is arranged in front of the vehicle. To notify the driver of the need to decelerate, display fields 76 assigned to guide object 74 are activated in the display to represent a braking procedure. Other warning symbols may also be optionally indicated. At this point, processing unit 4 checks the feasibility of passing slowly traveling vehicle 72. As slowly traveling vehicle 72 is approached, sensors mounted laterally on the vehicle check whether a left lane 77, which is separated from a right lane 78 by a lane marking 79, is clear. In addition, long-range sensors check whether the oncoming traffic in the left lane may allow a passing operation. Ultimately, the decision is the driver's as to whether he/she would like to pass slowly traveling vehicle 72. If he/she prepares to pass, by preparing to undertake the passing maneuver and by actuating left turn signal 80, guide object 74 indicates to him/her that the navigational device does not object to the passing operation. For that reason, at a third point in time 71''', the guide object is shown in the left lane next to vehicle 72. If, on the other hand, the navigational device has reservations about a passing maneuver, then a warning to this effect is output to the driver. At a fourth point in time 71'''', guide object 74 is returned to right lane 78. In this case, a right vehicle turn signal 81 is shown in operation. The vehicle now continues to follow the previously calculated travel route along road 71.

What is claimed is:

1. A navigational device for guiding a vehicle within a network of traffic routes, comprising:
 a processing unit for calculating a travel route to a destination;
 a display for displaying a guide object, a movement of the guide object along the calculated travel route being displayed in relation to a traffic route, whereby the movement of the guide object represents driving maneuvers to be performed by a driver of the vehicle to reach the destination;
 a determining arrangement to determine a traffic situation in front of the vehicle by sensing other vehicles in an area surrounding the guided vehicle; and
 an adaptive controlling arrangement to adaptively control the movement of the guide object depending on the traffic situation.

2. The navigational device of claim 1, wherein the guide object includes a vehicle image.

3. The navigational device of claim 1, wherein the guide object is displayed at a selected distance in front of a current position of the vehicle on the travel route in relation to the traffic route.

4. The navigational device of claim 1, wherein the display is configured to superimpose the guide object on the traffic route, within a field of view of a driver of the vehicle.

5. The navigational device of claim 1, further comprising:
 an arrangement for representing on the display an area surrounding the traffic route.

6. The navigational device of claim 1, further comprising:
 an arrangement for ascertaining a highest permissible speed, wherein the ascertained highest permissible speed is used for determining the traffic situation.

7. The navigational device of claim 1, wherein the guide object includes a display area for displaying at least one of directional displays and warning displays associated with a driving maneuver to be performed.

8. The navigational device of claim 1, further comprising:
 an arrangement for acoustically outputting driving instructions associated with the guide object.

9. The navigational device of claim 1, further comprising:
an arrangement for representing on the display an area surrounding the traffic route;
wherein the guide object includes a vehicle image,
wherein the guide object is displayed at a selected distance in front of a current position of the vehicle on the travel route in relation to the traffic route, and
wherein the display is configured to superimpose the guide object on the traffic route, within a field of view of a driver of the vehicle.

10. The navigational device of claim 1, further comprising:
an arrangement for ascertaining a highest permissible speed, wherein the ascertained highest permissible speed is used for determining the traffic situation; and
an arrangement for acoustically outputting driving instructions associated with the guide object;
wherein the guide object includes a display area for displaying at least one of directional displays and warning displays associated with a driving maneuver to be performed.

11. The navigational device of claim 1, further comprising:
an arrangement for representing on the display an area surrounding the traffic route;
an arrangement for ascertaining a highest permissible speed, wherein the ascertained highest permissible speed is used for determining the traffic situation; and
an arrangement for acoustically outputting driving instructions associated with the guide object;
wherein the guide object includes a vehicle image,
wherein the guide object is displayed at a selected distance in front of a current position of the vehicle on the travel route in relation to the traffic route,
wherein the display is configured to superimpose the guide object on the traffic route, within a field of view of a driver of the vehicle, and
wherein the guide object includes a display area for displaying at least one of directional displays and warning displays associated with a driving maneuver to be performed.

12. A navigational device for guiding a vehicle within a network of traffic routes, comprising:
a processing unit for calculating a travel route to a destination;
a display for displaying a guide object, a movement of the guide object along the calculated travel route being displayed in relation to a traffic route, wherein the movement of the guide object represents driving maneuvers to be performed by a driver of the vehicle to reach the destination; and
an actual highest permissible speed arrangement to determine an actual highest permissible speed at a location, wherein the highest permissible speed is used to influence a velocity of the guide object so that it does not move more rapidly along the travel route than is allowed by the highest permissible speed at the location, so that the driver is deterred from exceeding the highest permissible speed.

* * * * *

UNITED STATES PATENT AND TRADEMARK OFFICE
CERTIFICATE OF CORRECTION

PATENT NO.       : 8,406,990 B2
APPLICATION NO. : 10/528180
DATED            : March 26, 2013
INVENTOR(S)      : Barkowski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2372 days.

Signed and Sealed this
First Day of September, 2015

Michelle K. Lee
*Director of the United States Patent and Trademark Office*